Sept. 15, 1936. S. J. PERCY 2,054,442
IMAGE CLARIFIER FOR CAMERA FINDERS
Filed June 11, 1932
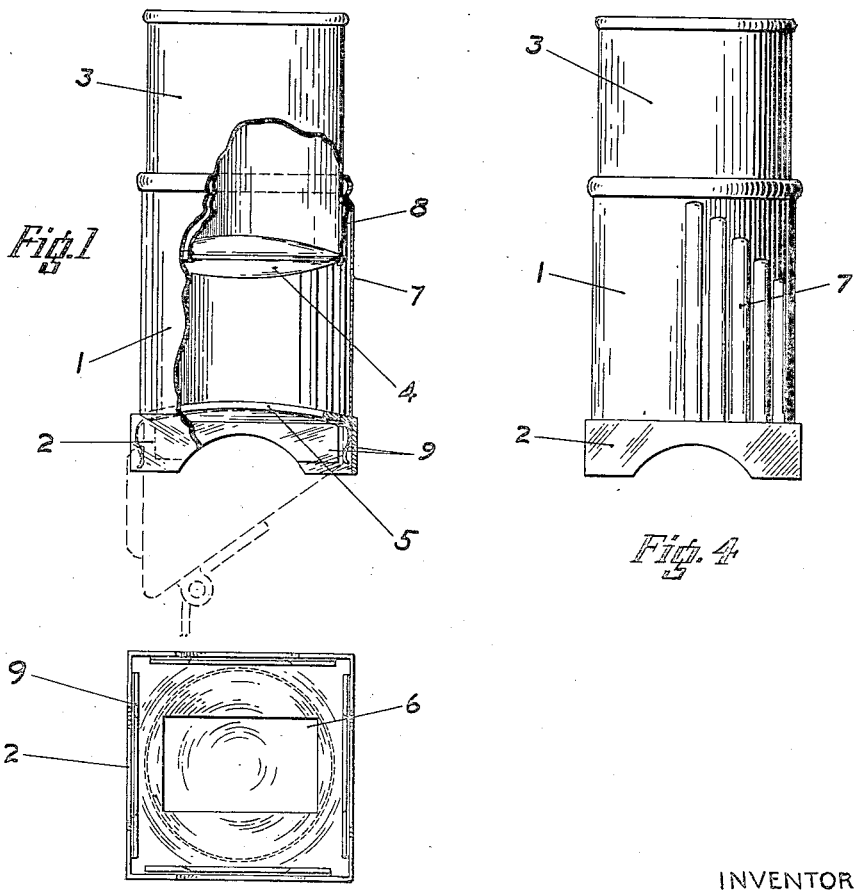
INVENTOR
Stephen John Percy Patented Sept. 15, 1936

2,054,442

UNITED STATES PATENT OFFICE 2,054,442

IMAGE CLARIFIER FOR CAMERA FINDERS

Stephen John Percy, New York, N. Y.

Application June 11, 1932, Serial No. 616,620

4 Claims. (Cl. 88—1.5)

My invention relates to means for making it easier to take photographs by clarifying and magnifying the image shown on the finder and making it easy to see this image even in bright daylight in the open.

The principal object of my invention is to provide a simple and inexpensive means for clarifying the image on the standard finder so that said image can be clearly and quickly seen, a thing which is quite difficult to do with the ordinary finder.

Another object is to provide means for magnifying the said image so that the details can be more clearly seen.

Another object is to provide a simple means for clarifying the image on the finder which can be readily used in connection with any camera.

Another object is to enable the photographer to locate the object he wishes to take more rapidly and easily.

Another object is to provide a collapsible clarifier so that the upper part can be pulled out to a definite position against a stop, thus eliminating the necessity for focusing the device each time it is used.

Another object is to provide a means whereby the picture in the finder will appear the same size and shape as that which will appear on the film.

It has always been difficult to see the image in an ordinary finder in bright light or else in rather dark places with the result that the finder often has to be shaded with the hand or otherwise to get the result and in any case it is very difficult to see the image quickly and clearly. In some cases a hood has been used some of them requiring that the face be placed against it in order to see the picture properly and they all have their limitations and most of them have to be built into the camera.

When my invention is placed over the finder of any camera the image can immediately be seen, clearly and enlarged, and it is not necessary to squint nor to use one eye, but the image can be clearly seen with both eyes open.

In most cameras the top of the finder is crossshaped in order to show either a long or a wide picture and this makes it hard to locate the image in the center or to see how much the picture will take in and the clarifier is therefore provided with a rectangular slot in the bottom and when used, is placed in the proper position on the finder.

The above explanation has been made because the device looks so simple that at first glance its advantages are not readily seen.

I attain the objects mentioned by the means shown in the accompanying drawing and in which:

Fig. 1 is a side view of the clarifier with part cut away to show the inside construction. The standard finder is shown dotted in to show its position relative to the clarifier.

Fig. 2 is a top view.

Fig. 3 is a bottom view showing the rectangular opening.

Fig. 4 is an external side view showing the raised grooves for allowing the inside member to be pulled out to various distances.

Referring to the drawing, 1 is a tubular member which is provided at its lower end with a rectangular part 2 which is adapted to fit over the standard finder, shown dotted. Telescoping into the member 1 is the tubular member 3 which is provided at its lower end with a lens 4 rigidly mounted therein. The inside of members 1, 2 and 3 are finished a matt black to absorb light.

The member 2 is provided with a part 5 which is curved approximately to the radius of the lens of the finder and is provided with a rectangular opening 6 to show in this face only the picture which will appear on the film.

The member 1 is also provided with the raised grooves 7 which vary in length and are closed at one end. The grooves 7 are adapted to be engaged by the spring finger 8 rigidly attached to the member 3, and by rotating members 1 and 3 relative to each other the finger 8 can be placed in any of the grooves 7. The length of the groove in which the finger 8 is located will limit the amount by which the member 3 can be pulled out relative to the member 1. The operator determines what particular distance of the lens 4 from the finder best suits his vision, places the finger 8 in the groove corresponding to this distance and leaves it in that groove. The members 1 and 3 are collapsed in order to be more compact for carrying and when the device is again used, it can immediately be drawn out to the proper focus.

It will be noted that the lens 4 is located at the lower end of the member 3 and this provides a shield above the lens and makes the image clearer.

The rectangular part 2 is provided with spring members 9 which help hold the clarifier to the finder.

I am aware that telescopic finders are not new and also that hoods and magnifying means over finders have been previously used and I therefore do not claim this combination broadly, but I claim:

1. Means for clarifying the image in a finder comprising means capable of fitting over the top of said finder, said means being provided with longitudinal grooves of various lengths and a member provided with a lens and a finger and capable of being moved rotatively and longitudinally relative to said grooved member, said finger being capable of being placed in one of said grooves and riding longitudinally therein thereby limiting the possible movement of said lens bearing member relative to said finder by a definite amount depending in which groove said finger is located.

2. Means for clarifying the image in a finder comprising a lens, means for supporting said lens, said supporting means being provided with a finger; means for slidably supporting said lens supporting means in a second named supporting means which is provided with grooves of various lengths in any one of which the said finger can ride whereby said lens supporting means is limited in its movement relative to its supporting means to set said lens a distance from said finder determined by the groove occupied by said finger.

3. In a means for clarifying the image in a finder and making it easier to locate the subject, the combination of a lens, a lens support member, a second member in which said lens support member is mounted for telescoping movement therewith, means for attaching said second member to the finder permitting the finder image to be visible thru said lens, means for limiting the longitudinal movement of said lens support member to any one of a plurality of predetermined positions, said limiting means comprising a plurality of grooves of various lengths extending longitudinally in one of said members and a finger on the other of said members sliding in one of the grooves and means for rotating one of the members relative to the other to set the finger in any desired groove.

4. In a means for clarifying the image in a finder and for making it easier to locate the subject, the combination of a member adapted to be attached to said finder and having an opening permitting the finder image to be visible to an observer, a second member movable both rotatively and longitudinally relative to said first member, a lens mounted in said second member, a plurality of elements spaced at various longitudinal positions on one of said members, a stop fixed on the other member engaging one of said elements when the members are moved relatively, and means for selecting any one of the elements to be engaged by said stop to limit the longitudinal movement of said one member relative to the other according to the particular element selected.

STEPHEN JOHN PERCY.